W. G. COLES.
LUBRICATOR.
APPLICATION FILED DEC. 22, 1919.
1,397,036.
Patented Nov. 15, 1921.
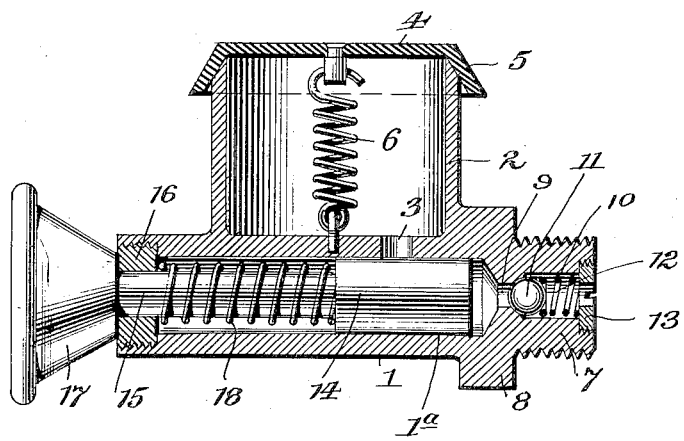
Inventor;
Wilfred E. Coles,
By
Attorneys

UNITED STATES PATENT OFFICE.

WILFRED G. COLES, OF MADISON, WISCONSIN, ASSIGNOR TO MADISON KIPP CORPORATION, OF MADISON, WISCONSIN, A CORPORATION OF WISCONSIN.

LUBRICATOR.

1,397,036.

Specification of Letters Patent.

Patented Nov. 15, 1921.

Application filed December 22, 1919. Serial No. 346,585.

*To all whom it may concern:*

Be it known that I, WILFRED G. COLES, citizen of the United States, residing at Madison, in the county of Dane and State of Wisconsin, have invented certain new and useful Improvements in Lubricators, of which the following is a specification.

This invention pertains to lubricators and has for its main object the production of a structure which may be readily applied to the part or point to be lubricated and which, furthermore, will maintain a body of lubricant adjacent such part or point from which a measured charge may be withdrawn and forced to the point or part to be lubricated.

The structure which forms the basis of the invention is shown in longitudinal sectional elevation in the annexed drawing.

In said drawing 1 denotes the main body having a cylinder or cylindrical bore 1ª formed therein. The body is surmounted by a reservoir or chamber 2 which is in communication with the cylinder through a port 3. A cover 4 is provided for the reservoir, said cover having a downwardly flaring overhanging rim or skirt 5, the under face whereof takes against the beveled or inclined upper edge of the reservoir. A spring 6 serves to hold the cover normally in a closed position while admitting of its being lifted and drawn to one side for the introduction of the lubricant. The overhang and downward inclination of the rim 5 acts to prevent collection of dirt and dust and precludes the same from getting into the reservoir.

The body 1 is provided with an externally threaded nipple or extension 7, and a nut shaped section 8 is provided to facilitate the placement of the structure. A port 9 extends from the cylinder and communicates with the bore 10 formed in the nipple. A check valve 11 normally closes the port, the valve being held to its seat by a spring 12 bearing thereagainst and against a threaded washer or perforated nut 13 secured in the outer end of the nipple. A piston 14 is mounted in the cylinder and its stem or rod 15 extends outwardly through a bushing 16 secured in the body, the stem having a handle 17 mounted on its outer end. A spring 18 encircling the stem and bearing at its ends on the piston and bushing 16 respectively acts to force the piston inwardly to the position shown in the drawing. In such position it will be noted that the port 3 is closed and the lubricant cannot flow from the reservoir. When, however, the piston is drawn to the left, such port is open and the lubricant is drawn by the sucking action of the piston from the reservoir into the cylinder ahead of the piston. Thereupon as the handle rod and piston are forced inwardly either manually or under the action of the spring 18, the lubricant ahead of the piston will be forced through port 9 unseating valve 11 and thence through the opening in the retaining member 13 to the part to be lubricated. The piston as it moves forwardly overlaps port 3 closing the same so that there can be no retrograde flow of the oil nor can there be any leakage from the reservoir. As will be appreciated the construction is at once simple and efficient. It may be easily assembled and readily applied.

What is claimed is,—

1. In a lubricator, the combination of a body having a cylinder formed therein; a piston mounted in the cylinder; means for actuating the piston; a reservoir located to one side of the cylinder and communicating therewith through a port, the upper edge of the reservoir being downwardly and outwardly beveled; a cover therefor, said cover having a downwardly projecting and outwardly flaring rim making close contact with the beveled upper edge; and a spring secured to the cover and the body portion acting to draw the cover to place.

2. In a lubricator, the combination of a body having a cylinder formed therein; a piston mounted in the cylinder; means for actuating the piston; a reservoir located to one side of the cylinder and communicating therewith through a port, the upper edge of the reservoir being downwardly and outwardly beveled; a cover therefor, said cover being provided with a seat upon its under face adapted to contact the beveled edge of the reservoir and likewise having a portion extending outwardly beyond the side wall of the reservoir; and a spring secured to the cover and the body portion acting to draw the cover to place.

In testimony whereof I have signed my name to this specification.

WILFRED G. COLES.